United States Patent Office 3,026,922
Patented Mar. 27, 1962

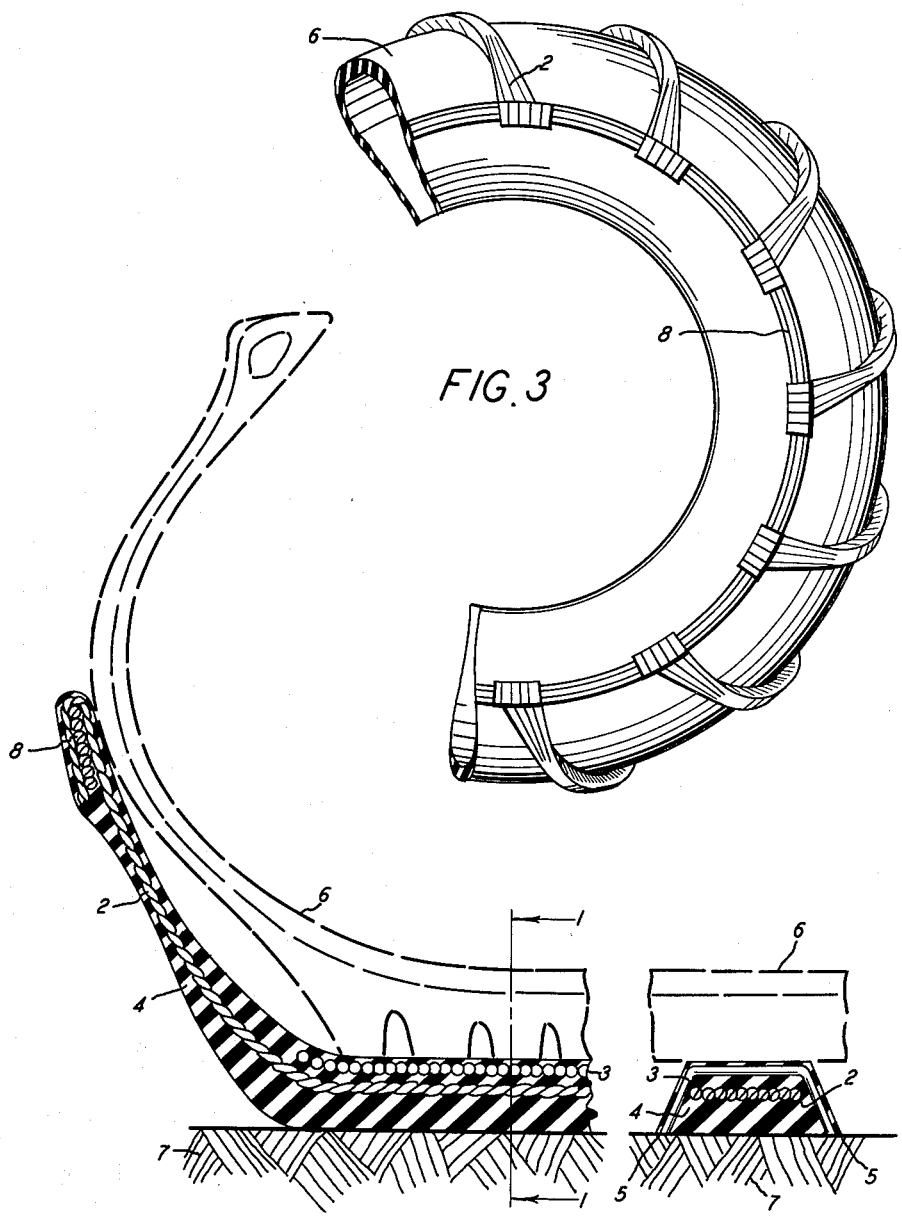

3,026,922
TRACTION LOOP CONSTRUCTION
Frank Akutowicz, 2007 Harvey Road, Wilmington, Del.
Filed Jan. 31, 1961, Ser. No. 86,115
1 Claim. (Cl. 152—221)

This disclosure describes a traction harness capable of providing superior traction and quietness compared to snow chains in common use. The harness resembles conventional snow chains in the arrangement of circumferential loops connecting transverse traction loops. This invention is for a novel traction loop made of tire cord, rubber and wire.

The function of tire chains is to provide alternative means of traction when dry friction is absent. Dry friction can be absent for a variety of reasons:

(1) Hard ice, both with and without a lubricating layer of water.
(2) Dry snow with and without ice underneath.
(3) Wet snow with and without ice underneath.
(4) Deep powdery snow.
(5) Deep wet snow.

In this list there are only two basic situations, however, which occur either alone or in combination. (a) Roadway covered with loose material, (b) hard, slippery roadway. Conventional snow chains respond to both of these situations, but each situation requires a different response. To clear the roadway the chain must be flexible, not fit too tightly, and present some bulk to the loose material. The unsatisfactory performance of snow tires occurs when the tread cannot shake itself clear before it is time to take another bite. Traction on a hard slippery roadway requires actual engagement of the chain with the ice so that traction becomes available up to the shearing strength of ice. In this way chains provide traction, but demand a considerable price in exchange. A major nuisance value of conventional chains is the high vibration level inside the car. A further nuisance exists as a consequence of the suburban living pattern: Lightly traveled access roads in the suburbs are never cleared of snow as quickly as heavily traveled main highways. Consequently chains needed for the short snowy part of a journey must be kept on for the long clear part. This mixed use is the source of most wear and expense in chains.

The object of the present invention is to obtain improvements in all aspects of chain usage: hard ice, soft snow, vibration level, and cost and wear in mixed use.

The longitudinal vertical section of the traction loop, FIGURE 1, is the important feature. FIGURE 2 is the transverse vertical section of the traction loop. FIGURE 1 is section 1—1 of FIGURE 2. FIGURE 3 shows traction loops assembled into a harness by means of circumferential connecting loops. The words longitudinal, transverse and circumferential are with respect to the wheel on which the traction harness is mounted. Tire 6 identifies the part of the wheel which makes contact with the traction harness.

In detail, FIGURE 1 shows a ribbon of cord reinforcement 2 straddled by wickets of wire 3, all vulcanized into a unit with tread stock rubber 4 in a mold conforming to the outline of the wickets. The legs of the wickets need not be of equal length.

The ends of the wire wickets provide conforming lines of contact at 5 with the ice, like the edges of an ice skate and provide high tractive effort without deep penetration—merely loading in shear a thin layer of ice instead of thicker spots of ice. The rubber stock should be adjusted such that the acute ground angles at 5 will be preserved as the loop wears out. By keeping the width of the longitudinal vertical section somewhat greater than its height, by using enough reinforcing cord, by running the traction loop diagonally, the loop can be kept from rolling under the tire during violent acceleration on dry pavement. A generally trapezoidal shape is necessary under the crown of the tire because when compressed a rectangular shape would lose the acute ground angles at 5, with consequent loss of traction.

The traction loop is shown in contact with the tire surface 6 and the road surface 7. The long edge of the longitudinal vertical section is in contact with the road surface to maintain acute angles at the corners 5. FIGURE 2 shows how a traction loop is attached to the circumferential loop 8. The cord reinforcement 8 is also vulcanized in rubber. FIGURE 2 also shows the ribbonlike reinforcement 2 running lengthwise in the traction loop. FIGURE 3 indicates that the reinforcement 2 is splayed to form a gusset upon juncture with 8. This configuration aids in maintaining the diagonal or skewed orientation of the traction loops across the tire tread.

I claim:

In a traction harness mounted on a road vehicle tire, including a pair of circumferentially extending spaced loops, one on each side of said tire, and having transversely oriented rubber traction loops extending therebetween, the traction loop construction comprising cord arranged for reinforcement in a ribbonlike configuration running lengthwise in the traction loops, and metal wickets conforming in outline to the generally longitudinal vertical section of said loops and embedded and vulcanized with said cord in said loops, said wickets contacting the ground at acute angles.

References Cited in the file of this patent

UNITED STATES PATENTS

| 923,456 | Stevenson | June 1, 1909 |
|---|---|---|
| 1,449,456 | Stewart | Mar. 27, 1923 |
| 1,776,588 | Kahlow et al. | Sept. 23, 1930 |
| 1,856,915 | Irvin | May 3, 1932 |
| 1,864,938 | Respess | June 28, 1932 |
| 1,963,939 | Dodge | June 19, 1934 |
| 2,132,614 | Gray | Oct. 11, 1938 |

FOREIGN PATENTS

| 778,818 | France | Jan. 2, 1935 |
|---|---|---|
| 1,021,271 | France | Nov. 26, 1952 |